July 2, 1957 H. F. RASMUSSEN 2,797,543
EAR CORN PICKUP EQUIPMENT FOR CORN HARVESTERS
Filed June 1, 1954 2 Sheets-Sheet 1
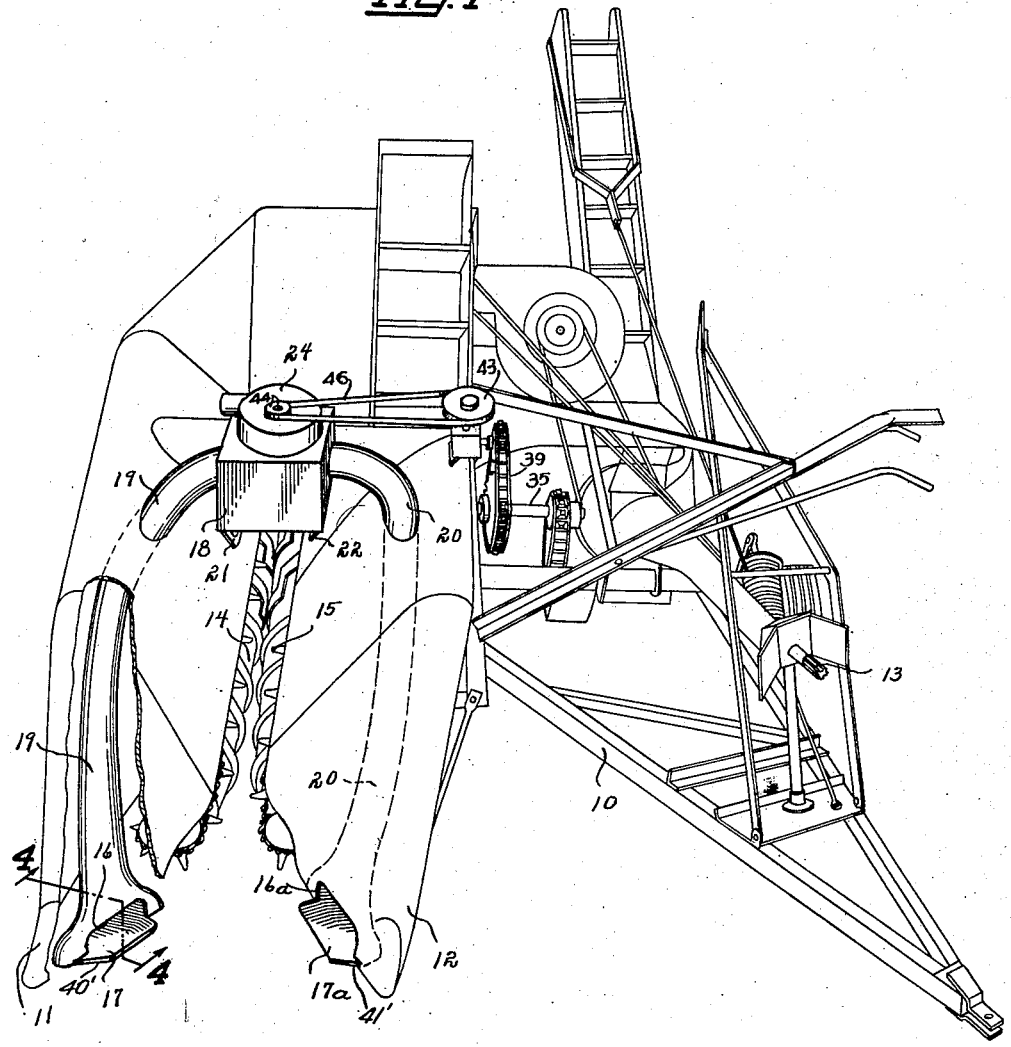
INVENTOR.
HAROLD F. RASMUSSEN
BY
Talbert Dick & Adler
ATTORNEYS.

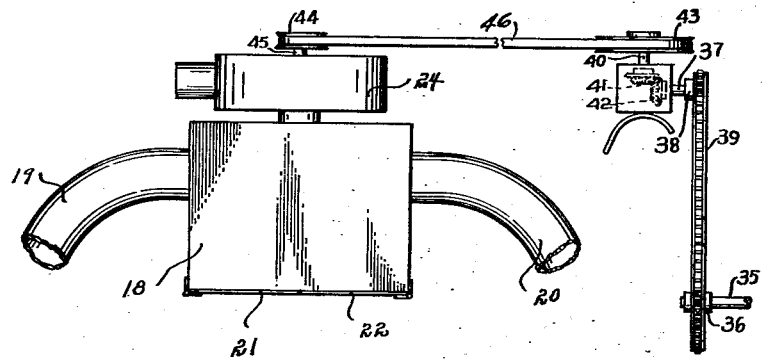
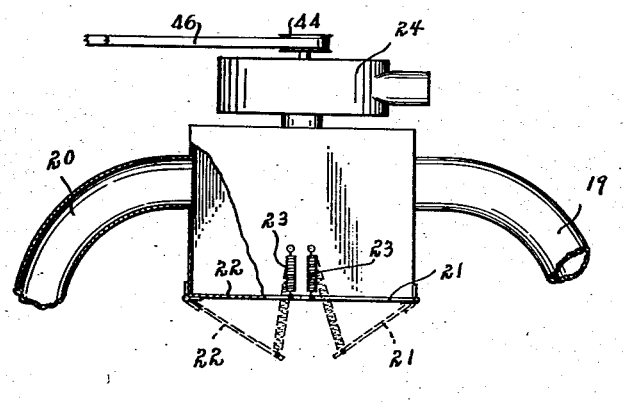
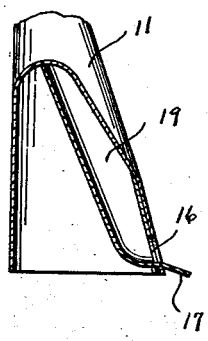
INVENTOR.
HAROLD F. RASMUSSEN
BY
*Talbert Dick & Adler*
ATTORNEYS.

United States Patent Office 2,797,543
Patented July 2, 1957

2,797,543

EAR CORN PICKUP EQUIPMENT FOR CORN HARVESTERS

Harold F. Rasmussen, Bronson, Iowa

Application June 1, 1954, Serial No. 433,637

6 Claims. (Cl. 56—15)

This invention relates to ear corn gathering implements and more particularly to a means for picking up independent ears of corn on the ground incapable of being picked up by the ordinary mechanical corn picker.

Due to storms, lack of strength of the ear corn butt, animals passing through a cornfield, and like disturbances, many ears of corn in a given field fall from the cornstalk and onto the ground surface. Mechanical corn pickers are only able to strip and obtain those ears of corn that are on the cornstalk. Thus every cornfield has a tremendous amount of loose ears of corn on the ground after the corn pickers have processed the field. Obviously, this is an economic loss and many corn raisers either hand pick such down ears after the corn pickers, or else run animals into the field to feed on these lost ears of corn.

Therefore, the principal object of my invention is to provide a corn picker or an attachment for a corn picker that will suck up these dropped ears of corn and deposit them into the corn picker mechanism at the same time as such mechanism is removing the ears of corn from the cornstalks.

A still further object of my invention is to provide a down ear suction retrieving mechanism that while successfully sucking up such independent ears from the ground, will not in the process materially suck up other foreign matter such as dirt.

A still further object of my invention is to provide a down ear corn gathering mechanism for mechanical corn pickers that has few moving parts.

Still further object of my invention is to provide a ground surface retrieving means for mechanical corn pickers that is easily installed, economical in manufacture, and durable in use.

These and other objects will be apparent to those skilled in the art.

My invention consists in the construction, arrangement, and combination of the various parts of the device, whereby the objects contemplated are attained as hereinafter more fully set forth, specifically pointed out in my claims, and illustrated in the accompanying drawings, in which:

Fig. 1 is a front view of a mechanical corn picker with my surface ear retrieving mechanism installed thereon and with sections cut away to more fully illustrate its construction, Fig. 2 is an enlarged sectional view of the upper portion of my device, Fig. 3 is a back view of the upper portion of the device with a portion cut away to illustrate its construction, and Fig. 4 is an enlarged cross sectional view of one of the lower ends of the device and is taken on line 4—4 of Fig. 1.

In these drawings I have used the numeral 10 to designate an ordinary mechanical corn picker having the usual forwardly and outwardly extending guide guards or fenders 11 and 12. Many corn pickers have two, four or more pairs of these pointed guards 11 and 12 inasmuch as two for each row of corn being harvested are required. Some mechanical corn pickers are motorized and others are pulled or pushed by a tractor. In most cases, the mechanism of such corn harvester are operatively connected to the power take-off of the tractor (not shown). In Fig. 1, I show the main driving shaft 13 adapted to be connected to such power take-off (not shown) of a tractor.

The snapping rolls for each row of corn to be harvested is designated by the numerals 14 and 15. These snapping rolls extend upwardly and rearwardly.

Thus far I have described features of an ordinary and well known mechanical corn picker. It is to such equipment that I install my device and which I will now describe in detail.

On the lower inside and adjacent the ground surface of each of the members 11 and 12 I provide a horizontal slot opening 16 and 16a, respectively, and capable of receiving an ear of corn. Adjacent the bottom of each of these slot openings is a horizontal lip, ledges or bar 17 and 17a, respectively. These ledges 17 and 17a extend substantially parallel with the lower edges of the members 11 and 12, which extend forwardly and outwardly as before noted. Each leading edge 40' and 41', respectively, of the lip ledges 17 and 17a becomes narrowed or beveled (as shown in Fig. 1) as it approaches the guard to which it is attached so as to aid in the guiding of the cornstalks without catching thereon, in and to the snapping rolls. The numeral 18 designates a relatively large container secured to the corn picker and with its bottom directly above the upper ends of the snapping rolls 14 and 15. The numeral 19 designates a conduit having one end communicating with the horizontal slot opening 16 of the member and its other end communicating with one end of the container 18 as shown in Fig. 1. The numeral 20 designates a like conduit having one end communicating with the slot opening 16 of the member 12 and its other end communicating with the other end of the container 18. By this arrangement of parts the conduits 19 and 20 will horizontally communicate with the inside of the container at diametrically opposite points and supporting the same. The combined inside area of the conduits are less than that of the area of the container 18, and they communicate with the container at points substantially above the bottom of the container as shown in Fig. 2. The bottom of the container consists of two hinged trap doors 21 and 22, each capable of downward dropping movement. A coil spring 23, counterbalance weight or like is used to yieldingly hold each of the trap doors in a closed position. The numeral 24 designates a suction fan having its inlet area communicating with the inside top of the container 18 and its discharge end communicating with the outside atmosphere. This suction fan is operatively connected for power, to the power line means of the corn picker; i. e., to the picker line shaft 35. In the drawings I show a sprocket wheel 36 on the shaft 35, a rotatably mounted stub shaft 37, a sprocket wheel 38 on the stub shaft, an endless chain 39 embracing the sprocket wheels 36 and 38, a second rotatably mounted stub shaft 40, a bevel gear 41 on the second stub shaft and in mesh with a bevel gear 42 on the stub shaft 37, a pulley wheel 43 on the stub shaft 40, a pulley wheel 44 on the fan shaft 45, and an endless belt 46 embracing the pulley wheels 43 and 44.

The practical operation of the device is as follows: With the corn picker in operation, the suction fan will be rotated thereby sucking air through the slots 16. This air stream will pass upwardly and rearwardly through the conduits, thence into the container 18, thence through the suction fan and to the outside atmosphere through its discharge port. Obviously, the air will have high velocity through the slot opening and the conduits. However, upon reaching the inside of the large area container 18 the air will be greatly reduced in velocity, thereby dropping any heavy object like an ear of corn into the bottom of the container 18. This non-support of heavy objects such as ears of corn is further encouraged by the change of direction of air flow, i. e., the air enters the container horizontally and leaves it in a vertical direction. Also the air streams enter the container at two diametrically opposite points thereby conflicting with each other and further encouraging ears of corn to fall to the container bottom as the corn picker moves over the ground, loose ears of corn will be sucked through the slot openings. After a sufficient number have been deposited in the bottom of the container, their weight will overcome the trapdoors, the same will momentarily open, and drop the ears onto the snapping rollers, and thus into the corn picker. The lip ledges directly below the slot openings 16 will direct the suction from near a horizontal plane which will affect ears of corn laying on the ground, but will avoid direct suction upwardly from the ground. By this construction little foreign matter is sucked into the device.

Some changes may be made in the construction and arrangement of my ear corn pickup equipment for corn harvesters without departing from the real spirit and purpose of my invention, and it is my intention to cover by my claims, any modified forms of structure or use of mechanical equivalents which may be reasonably included within their scope.

I claim:

1. In combination, a corn picker having two forwardly and outwardly extending dividing guards and snapping rolls; said guards each having a slot opening in its inner lower side, a container above said snapping rolls, a conduit leading from each of said slot openings to said container, a suction means communicating with the inside of said container, and a trap door in the bottom of said container for permitting ears of corn originally sucked into the same through said slot openings and conduits, to fall at times onto said snapping rolls.

2. In combination, a corn picker having two forwardly and outwardly extending dividing guards and snapping rolls; said guards each having a slot opening in its inner lower side, a container above said snapping rolls, a conduit leading from each of said slot openings to said container; said two conduits entering said container at diametric opposed points, a suction means communicating with the inside of said container, and a trap door in the bottom of said container for permitting ears of corn originally sucked into the same through said slot openings and conduits, to fall at times onto said snapping rolls.

3. In combination, a corn picker having two forwardly and outwardly extending dividing guards and snapping rolls; said guards each having a slot opening in its inner lower side, a container above said snapping rolls, a conduit leading from each of said slot openings to said container; said two conduits entering said container at diametric opposed side points and above the bottom plane of said container, a suction means communicating with the inside of said container, and a trap door in the bottom of said container for permitting ears of corn originally sucked into the same through said slot openings and conduits, to fall at times onto said snapping rolls.

4. In combination, a corn picker having two forwardly and outwardly extending dividing guards and snapping rolls; said guards each having a slot opening in its inner lower side, a container above said snapping rolls, a conduit leading from each of said slot openings to said container, a suction means communicating with the inside top portion of said container, and a trap door in the bottom of said container for permitting ears of corn originally sucked into the same through said slot openings and conduits, to fall at times onto said snapping rolls.

5. In combination, a corn picker having two forwardly and outwardly extending dividing guards and snapping rolls; said guards each having a slot opening in its inner lower side, a container above said snapping rolls, a conduit leading from each of said slot openings to said container, a horizontal lip below each of said slot openings, a suction means communicating with the inside of said container, and a trap door in the bottom of said container for permitting ears of corn originally sucked into the same through said slot openings and conduits, to fall at times onto said snapping rolls.

6. In combination, a corn picker having two forwardly and outwardly extending dividing guards and snapping rolls; said guards each having a slot opening in its inner lower side, a container above said snapping rolls, a conduit leading from each of said slot openings to said container; said container having a greater air flow capacity due to its relative size than the combined air flow capacity of said two conduits, a suction means communicating with the inside of said container, and a trap door in the bottom of said container for permitting ears of corn originally sucked into the same through said slot openings and conduits, to fall at times onto said snapping rolls.

References Cited in the file of this patent

UNITED STATES PATENTS

| | | |
|---|---|---|
| 752,790 | Miller | Feb. 23, 1904 |
| 1,107,083 | Lovejoy | Aug. 11, 1914 |
| 1,139,492 | Creekmore | May 18, 1915 |
| 2,133,905 | Rund, Jr. | Oct. 18, 1938 |
| 2,471,771 | Parks et al. | May 31, 1949 |
| 2,493,422 | Sartin | Jan. 3, 1950 |